Patented Mar. 16, 1948

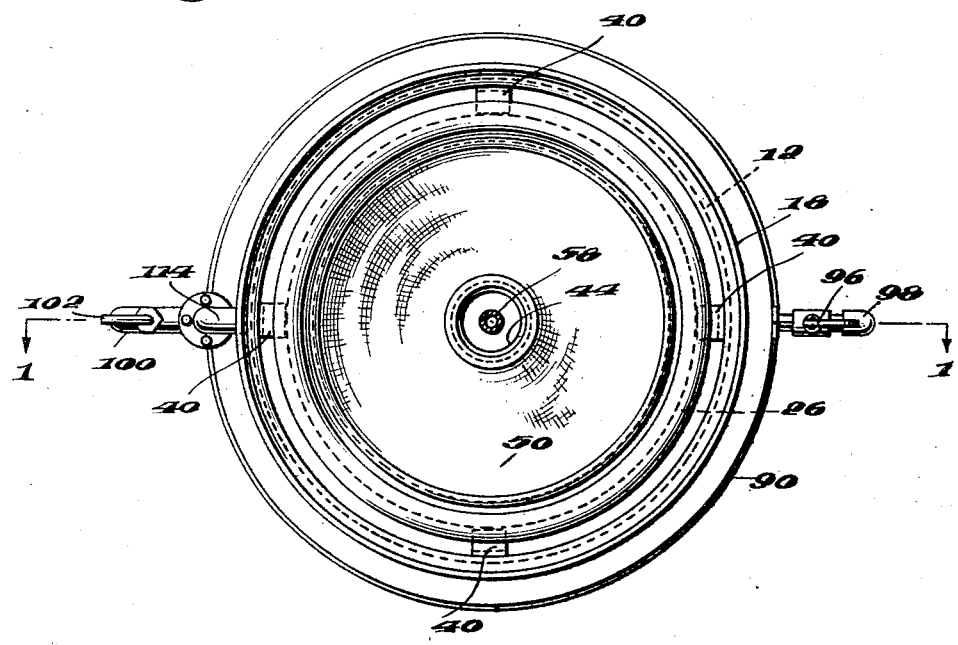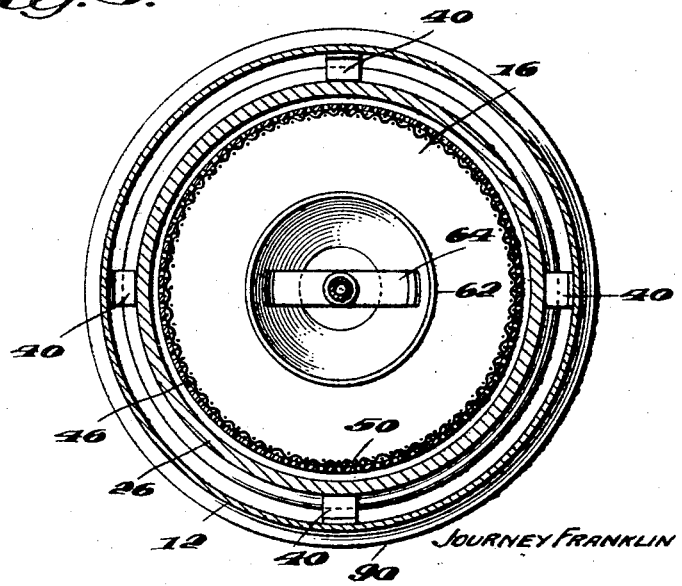

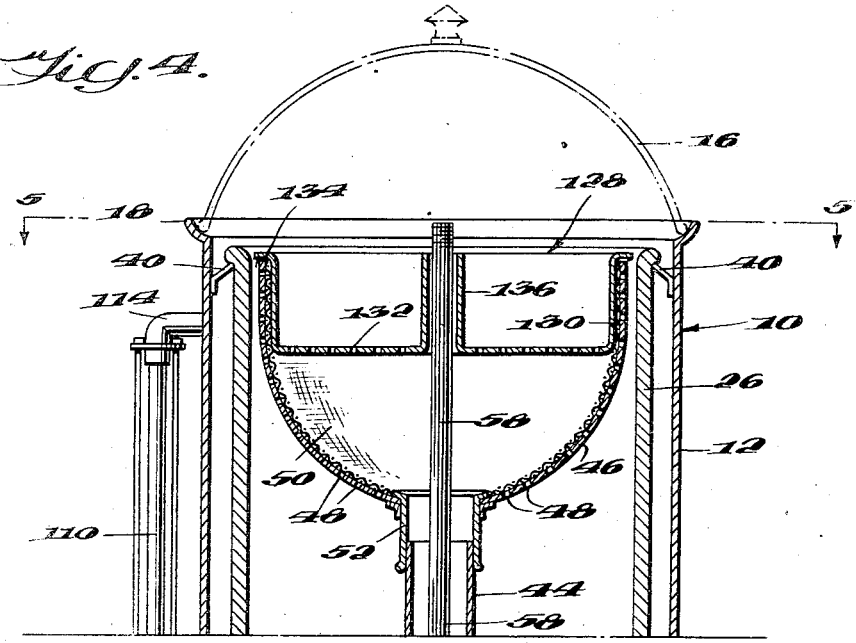
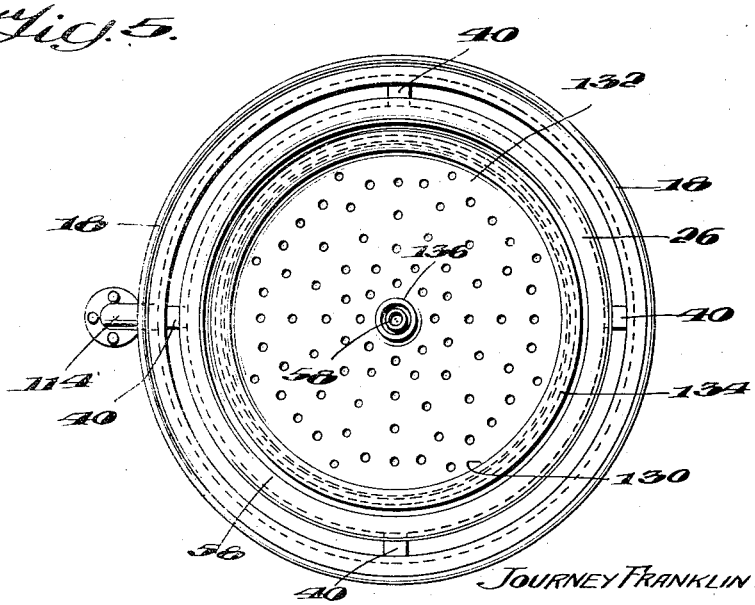

2,437,768

UNITED STATES PATENT OFFICE 2,437,768

METHOD AND APPARATUS FOR MAKING BEVERAGES

Journey Franklin Timberlake, Charlottesville, Va.

Application February 10, 1944, Serial No. 521,824

8 Claims. (Cl. 99—71)

This invention relates to a process and means for making beverages, and has for one of its prime objects the provision of a method and apparatus for economically producing more delectable coffee beverages.

Another object of this invention is to provide a process for making coffee beverages wherein the coffee is mixed with water and the mixture is then agitated and beaten in order to extract coffee compounds therefrom.

A still further object of this invention is to provide apparatus for making coffee beverages, the apparatus having means for mixing water with coffee and means for agitating and beating the mixture in order to obtain coffee extracts.

Other and further objects and advantages of this invention will become more apparent from a consideration of the following specification when read in the light of the accompanying drawings in which:

Figure 2 is an elevational view taken on the line 2—2 of Figure 1, looking in the direction of the arrows.

Figure 3 is a cross-sectional view taken on the line 3—3 of Figure 1, looking in the direction of the arrows.

Figure 4 is a partial cross-sectional view taken on the line 1—1 of Figure 2, showing details of cleaning apparatus.

Figure 5 is a top plan view taken on the line 5—5 of Figure 4 with the cleaning apparatus secured in place.

Figure 1:
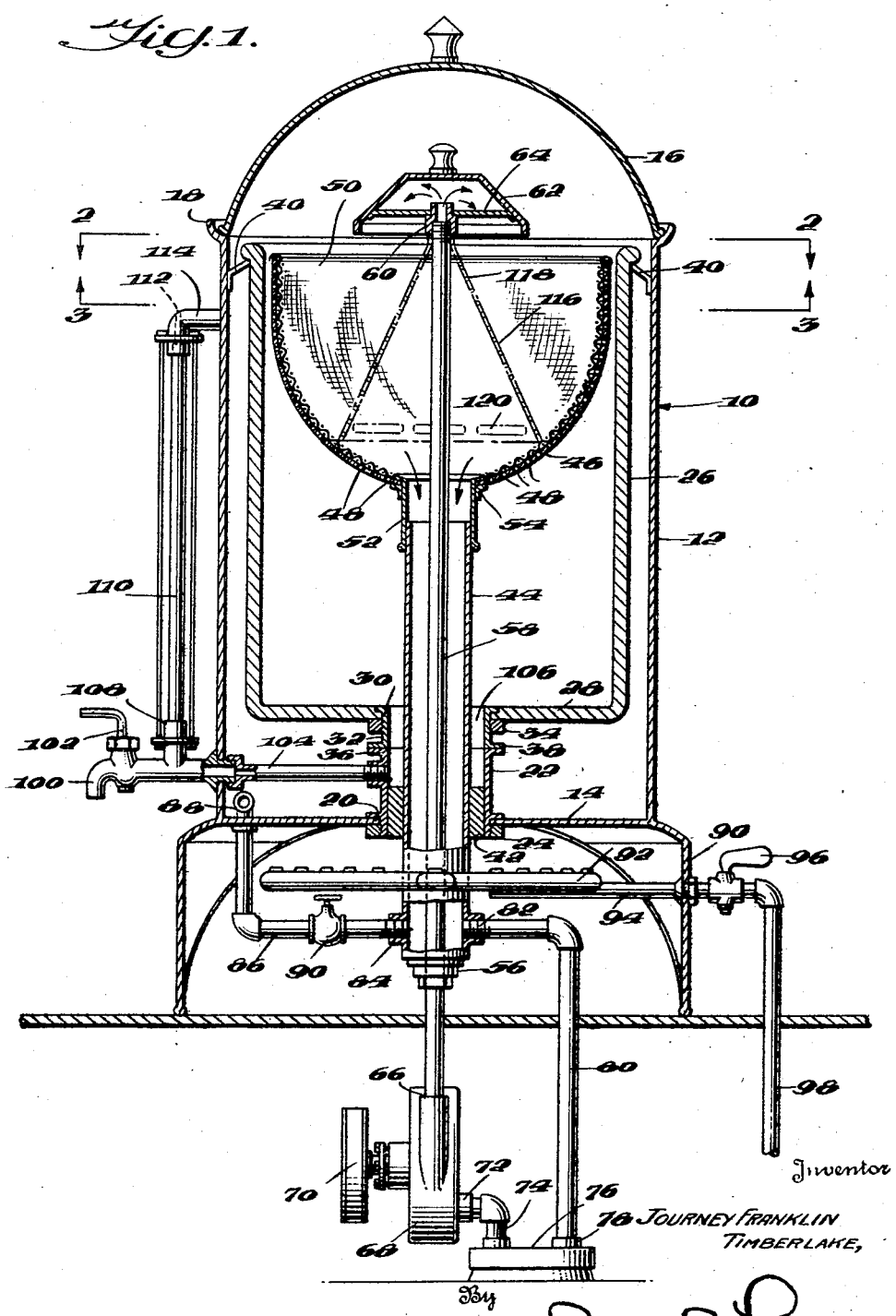
Figure 1 is a cross-sectional view partly in elevation, taken on the line 1—1 of Figure 2, looking in the direction of the arrows.

Referring now more specifically to the drawings the reference numeral 10 indicates, in general, a coffee making device provided with a cylindrical water receptacle having the side wall 12 and a lower end closure member 14. A removable upper end closure member 16 is adapted to be seated in a radially outwardly extending lip or shoulder portion 18 formed on the upper end of the wall 12.

An aperture 20 is formed in the lower end closure member 14, the center of which is positioned on the longitudinal axis of the receptacle 12. A supporting coupling 22 engages the aperture 20 and extends upwardly therefrom. The coupling 22 is held in water tight engagement with the aperture 20 by means of the lock nut 24 which threadedly engages a threaded lower projecting portion of the coupling 22.

A second cylindrical receptacle 26 is provided with an end closure wall 28 which is also provided with a centrally disposed aperture 30 through which a coupling unit 32 depends. The coupling 32 is held in water tight engagement with the aperture 30 by means of the lock nut 34.

The upper end of the coupling 22 and the lower end of the coupling 32 are each provided with radially outwardly extending flanges 36 and 38, respectively. These flanges are provided with complementary water tight locking means (not shown) in order to releasably secure and support the receptacle 26 on the coupling 22 within the outer cylinder 12.

Brackets 40 are fixedly secured to the inner surface of the cylindrical wall 12 at spaced intervals around its periphery and project radially inwardly therefrom. The brackets 40 are adapted to hold the receptacle 26 in spaced relation with respect to the wall 12.

A spacing ring 42 is disposed intermediate the inner wall of the coupling 22 and engages the outer surface of a pipe 44. As will be seen from Figure 1, the pipe 44 extends upwardly from the end wall 28 to a point below the upper end of the wall 26 and also projects downwardly to a point below the lower end of the coupling 22.

A substantially bowl-shaped coffee container 46 is provided with perforations 48 and an inner detachable strainer cloth 50. The cloth 50 acts as a filter unit and, of course, may be constructed of any suitable material.

The container 46 has an aperture formed in the lowermost end portion thereof through which is extended the coupling 52. The coupling projects for a short distance below the base of the container 46 and is rigidly secured at its upper end by the lock ring 54. The inner diameter of the coupling 52 gradually decreases from the lower end thereof to its upper end in order to provide a tapering inner wall. As seen from Figure 1, the coupling 52 slidingly engages the upper end of the pipe 44 and supports the container in elevated position after the tapered inner surface of the coupling 52 has engaged the outer surface of the pipe 44 in a watertight junction.

The lower end of the pipe 44 is provided with a reducing plug 56 through which extends a pipe 58. The pipe 58 projects upwardly through the pipe 44 and is coaxial therewith and is held in spaced relationship with respect to pipe 44 by the plug 56. The upper end of the pipe 58 is threaded in order to engage the threaded cap 60 which is rigidly secured to the inverted conically-shaped beating element 62 by means of the radially extending arms 64.

The lower end of the pipe 58 is secured to the outlet port of any suitable pumping unit 68. The pump 68 may be driven by an electric motor (not shown) through a belt connection with the pulley 70.

The inlet port 72 is connected by a suitable conduit 74 which extends downwardly within a sump 76 which is also provided with a coupling 78 to which one end of the conduit 80 is connected. The other end of the conduit 80 is connected with the interior of the pipe 44 adjacent the lower end thereof through the screw-threaded junction 82. A second screw-threaded junction 84 is provided on the lower end of the pipe 44 and is adapted to receive one end of a conduit 86, the other end of which projects through a suitable opening formed in the side wall 12 at a point 88 adjacent the end closure member 14. A hand operated valve 90 is disposed intermediate the ends of the pipe 86.

The water receptacle 10 is provided with a supporting skirt 90 in order to provide space for a gas heating unit 92 connected by the conduit 94 to a control valve 96 which is in turn connected with a suitable fuel supply by the conduit 98.

A faucet or tap 100 provided with a manually operated valve 102 is rigidly mounted on the exterior of the wall 12 and is connected with the interior of the receptacle 26 by the pipe 104 and the channel 106.

The faucet 100 is also provided with a mounting 108 for a fluid gauge glass 110 which is vented to the atmosphere at 112 and supported at its upper end by the bracket 114, the gauge indicating the height of the fluid contents within the receptacle 26.

The operation of the device is as follows:

The valve 90 is turned to its closed position and the operator then removes the cover 16 and fills the receptacle 10 with water. (If desired an inlet can be cut into the side wall of the container 10 in order to facilitate the introduction of the water.)

When the receptacle 10 is filled, fuel from the burner 92 is ignited and the water begins to heat. During the heating period a definite proportion of coffee is measured out and placed in the container 46.

Assuming the water has been brought to a temperature of 180–185° F., a temperature criteria found to yield the best results, the valve 90 is opened and the hot water is conducted to the inlet 72 of the pump 68 through the conduits 86, 44, 80, the sump 76, and conduit 74.

The operator then actuates the pump 68 thereby forcing the water upwardly through the pipe 58 with sufficient pressure to cause it to impinge against the baffle plate 62.

After striking the plate 62 the water falls on the coffee disposed in the perforated container 46 in sufficient volume to cause a portion of the water to wash some of the coffee downwardly through the pipe 44 and return to the sump 76 through the conduit 80. A portion of the water falling on the coffee in the container 46 passes through the filter 50, the perforations 48 into the container 26. The tap 100 being connected to the container 26 through the pipe 104 and passage 106 is adapted to be operated at will in order to draw off the finished coffee.

The coffee which has been carried into the sump is drawn up with the hot water through the pipe 74 and into the pump 68. The entrained coffee is then discharged against the baffle plate 62 from the pipe 58. The impinging of the coffee against the plate extracts the various coffee compounds therefrom and these compounds then filter through the coffee remaining on the container 46 and the filter 50 and fall into the receptacle 26.

As this operation is repeated the coffee is continuously kept in circulation and the continued agitation thereof produced by impinging against the baffle plate while entrained in the hot water produces a filtered coffee beverage of an exquisite flavor.

A modification of this invention is also illustrated in Figure 1. If desired a perforated cone-shaped element 116 may be supported on the container 46. This element is slidably mounted on the pipe 58 at the apex thereof and is provided with a plurality of perforations 118 and elongated horizontal slots 120.

When using the element 116 coffee is disposed between the exterior surface thereof and the container 46. Part of the hot water passing through the coffee from the baffle plate 62 washes the coffee through the slots 120 downwardly into the pipe 44, while still another portion passes through the perforations 118, the remainder seeping through the coffee and passing into the container 26 through the perforations 48. The operation of the apparatus in all other respects is identical to that described above.

Experimentation has determined that an excellent coffee beverage results from the use of the above described apparatus and process when using only one-third the amount of coffee normally used for producing the same amount of beverage.

A still further advantage of apparatus of the type described resides in the fact that the filter 50 may be easily cleaned without requiring that it be handled. To carry out the cleaning step the sump 76 is emptied of its contents and reconnected to the pipes 74 and 80. The baffle plate 62 is removed and a hose connected to the upper end of the pipe 58. The valve 90 is opened and the pump 68 actuated. This results in the pumping of a clear stream of water from the receptacle 26 through the hose element which is then operated to wash down the coffee grounds adhering to the element 50 (and/or the conical element 116). The cleansing completed, the pump 68 is rendered ineffective, the hose disconnected from the pipe 58 and the baffle plate 62 is again releasably secured thereto, the valve 90 is closed and the sump 76 is again emptied and returned to its proper position.

The cleaning process may be modified if the apparatus shown and described in Figures 4 and 5 is employed. As illustrated therein, the baffle plate 62 is removed from the upper threaded end of the pipe 58. If the conical member 116 has been used during the making of the coffee beverage then it must also be removed by sliding it over the end of the pipe 58. After removing these parts a substantially circular container 128 having a side wall 130 and a perforated base 132 is disposed within the container 46 and is supported therein by the radially outwardly extending flange portion 134 which is adapted to engage the upper end of the wall of container 46. A centrally disposed hollow stem 136 projects upwardly from the base 132 and is adapted to be slide over the top portion of the pipe 58, the two elements being held in substantially coaxial alignment by the engagement of the flange portion 134 with the upper end of the container 46.

To clean the coffee making apparatus a hose has one of its ends secured to the threaded upper end of the pipe 58 and the pump is actuated. The coffee grounds entrained in the fluid is pumped upwardly through the pipe 58 and through the hose member, the other end of which is directed downwardly in such a manner as to cause the mixture to flow into the container 128. The coffee grounds are caught by the container 128 while the fluid passes through the perforated base 132 to wash downwardly into the conduit 44 other coffee grounds which may be adhering to the upper surface of the filter 50. As soon as the discharge end of the hose member discharges fluid clear of coffee grounds the pump 68 is stopped, the hose disconnected from the pipe 58, and the container 128 is removed from the apparatus. The baffle plate 62 and the conical member 116 are then replaced in their respective positions.

I claim:

1. In a device of the type described, a water container, a coffee solution container, a funnel shaped filter adapted to support ground coffee and having a discharge orifice, a baffle plate positioned above said filter, a fluid pump, means connecting said pump to receive water from said water container, means for directing the output of said pump forcefully against said baffle for distribution to said filter, means connecting said pump to receive fluids passing through said filter orifice, said filter being adapted to pass to said coffee solution container a portion of the fluids received thereby and to cause a portion of the water received thereby to wash a portion of the ground coffee on said filter into said discharge orifice, and means connecting said pump to receive the water and ground coffee passing into said filter orifice, whereby a continuous circulation of water and entrained grounds takes place from said filter to said pump, then to said baffle, and back to said filter.

2. A coffee maker comprising an outer water container, an inner coffee solution container spaced from said outer container, a funnel shaped ground coffee supporting filter within said inner container, said filter having a discharge conduit extending through adjacent walls of said containers to the exterior of said outer container, a second conduit within and spaced from said discharge conduit and having an external opening outside of said discharge conduit, a baffle mounted in proximity to one end of said second conduit for directing fluids from said conduit onto said filter, a fluid pump, means connecting the outer end of said discharge conduit to the intake of said pump, means for passing the discharge of said pump into the external opening of said second conduit, and means for conducting water from said outer container to said connecting means, whereby a portion of the water transmitted to said filter by way of said second conduit and said baffle passes through said filter and into said coffee solution container, and a portion of said water runs into said discharge conduit carrying with it a portion of the ground coffee supported by said filter, said last mentioned water portion and the ground coffee carried therewith being then recirculated by said pump.

3. A coffee maker as set forth in claim 2 in which are provided an extension of said inner container of greater diameter than said discharge conduit at the point where said discharge conduit passes through a wall of said inner container, and coffee solution dispensing means opening into said extension.

4. A coffee maker as set forth in claim 2 in which a cone shaped element is mounted about the end of said second conduit to receive fluids and groups from said baffle, said element having openings therein permitting the passage of liquids only and other openings permitting the passage of both liquids and ground coffee, whereby the liquids passing through said first mentioned openings and the liquids and grounds passing through said other openings pass to said discharge conduit, while the remainder of the fluids pass through said filter and into said coffee solution container.

5. A process of making a coffee beverage comprising the steps of passing water into contact with ground coffee so that one portion of the water passes through said ground coffee while another portion of the water entrains with it a portion of said ground coffee, and recirculating said second named portion with the entrained ground coffee into contact with the remainder of the ground coffee.

6. A process of making a coffee beverage as set forth in claim 5 in which said recirculation is accompanied by forceful deflection of said second named portion of water and entrained coffee into contact with the remainder of the ground coffee.

7. A process as defined in claim 5 in which additional water is added to said second named water portion during said recirculation.

8. A process as defined in claim 5 in which the water utilized is maintained at a temperature of 180°–185° F.

JOURNEY FRANKLIN TIMBERLAKE.

REFERENCES CITED

The following references are of record in the file of this patent:

UNITED STATES PATENTS

| Number | Name | Date |
|---|---|---|
| 120,417 | Craggs | Oct. 31, 1871 |
| 227,805 | Mathes | May 18, 1880 |
| 429,139 | Malen | June 3, 1890 |
| 674,456 | Darden | May 21, 1901 |
| 1,137,265 | Hubner | Apr. 27, 1915 |
| 1,226,005 | Rathman | May 15, 1917 |
| 1,300,175 | Kittinger | Apr. 8, 1919 |
| 1,469,139 | Acquaviva | Sept. 25, 1923 |
| 1,710,218 | Kelly | Apr. 23, 1929 |
| 1,762,209 | Aborn | June 10, 1930 |
| 1,789,334 | Englung | Jan. 20, 1931 |
| 1,984,047 | Thieme | Dec. 11, 1934 |
| 2,356,784 | Graham | Aug. 29, 1944 |